United States Patent
Smith

(10) Patent No.: US 8,899,614 B2
(45) Date of Patent: Dec. 2, 2014

(54) CHILD SUPPORT APPARATUS

(71) Applicant: Mamas and Papas (Holdings) Limited, Yorkshire (GB)

(72) Inventor: Peter Smith, Leeds (GB)

(73) Assignee: Mamas & Papas (Holdings) Limited, Huddersfield (GB)

( * ) Notice: Subject to any disclaimer, the term of this patent is extended or adjusted under 35 U.S.C. 154(b) by 0 days.

(21) Appl. No.: 13/788,106

(22) Filed: Mar. 7, 2013

(65) Prior Publication Data
US 2014/0008946 A1    Jan. 9, 2014

(30) Foreign Application Priority Data

Jul. 3, 2012  (GB) .................................. 1211741.2

(51) Int. Cl.
| | |
|---|---|
| *B62B 1/00* | (2006.01) |
| *B62B 9/10* | (2006.01) |
| *B62B 9/12* | (2006.01) |
| *A47D 1/02* | (2006.01) |
| *B62B 7/08* | (2006.01) |

(52) U.S. Cl.
CPC . *A47D 1/02* (2013.01); *B62B 9/102* (2013.01); *B62B 9/104* (2013.01); *B62B 7/08* (2013.01); *B62B 9/12* (2013.01)
USPC ....................................................... 280/657

(58) Field of Classification Search
CPC .............. B62B 7/08; B62B 7/12; B62B 3/02; B62B 7/044; B62B 3/144; B62B 3/14; B62B 2205/20; B60N 2/2806; B60N 2/2854; B25H 7/04
USPC ......... 280/33.993, 47.38, 647, 639, 650, 643, 280/644, 648–649, 658; 297/195.13, 218.1, 297/218.2, 218.3, 440.11, 219.12
See application file for complete search history.

(56) References Cited

U.S. PATENT DOCUMENTS 3,797,848 A * 3/1974 Burnham ...................... 280/644
6,062,589 A   5/2000 Cheng
(Continued)

FOREIGN PATENT DOCUMENTS

| CN | 201816628 | 5/2011 |
|---|---|---|
| DE | 9102763 | 5/1991 |

(Continued)

*Primary Examiner* — John Walters
*Assistant Examiner* — James Triggs
(74) *Attorney, Agent, or Firm* — Gordon & Jacobson, PC

(57) ABSTRACT

A collapsible child support apparatus includes a frame supporting a seat for the child, the frame and the seat having an open condition for seating a child in the seat and a collapsed condition. The frame includes left and right frame assemblies, each frame assembly comprising a front member, a rear member and a handle member pivotally mounted together by a hinge member to allow pivotal movement of the frame members between open and collapsed conditions. The seat includes a seat base supported by the front frame members, a seat back suspended to the handle members and a seat pivot to allow the seat back and seat base to pivot between open and closed conditions, wherein the seat back is suspended to the handle members to allow the seat back to pivot to any one of a plurality of reclined positions relative to the seat base in the open condition. Each frame assembly comprises a strut of fixed length which is connected between the seat pivot and the handle member for resisting movement of the seat pivot relative to the frame in the open condition.

11 Claims, 3 Drawing Sheets

(56) References Cited

U.S. PATENT DOCUMENTS

| | | | |
|---|---|---|---|
| 6,880,850 B2 * | 4/2005 | Hsia | 280/642 |
| 7,753,398 B2 * | 7/2010 | Yang | 280/642 |
| 2007/0096434 A1 * | 5/2007 | Haeggberg | 280/642 |

FOREIGN PATENT DOCUMENTS

| | | |
|---|---|---|
| GB | 2427390 | 12/2006 |
| GB | 2448059 | 10/2008 |

* cited by examiner

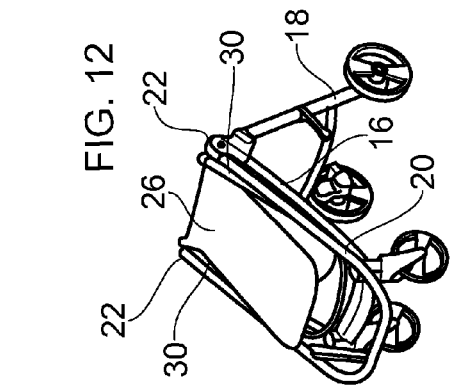
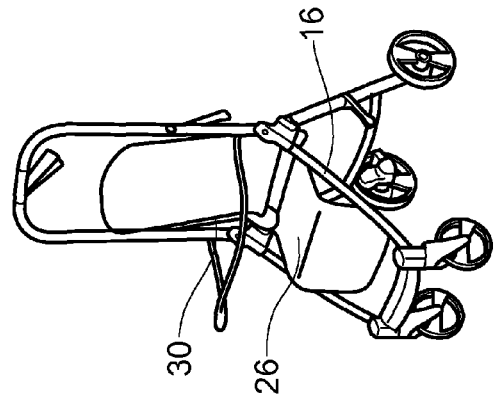
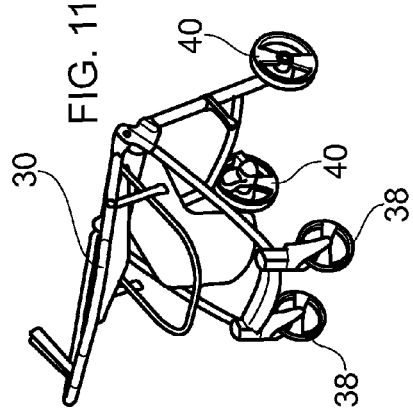
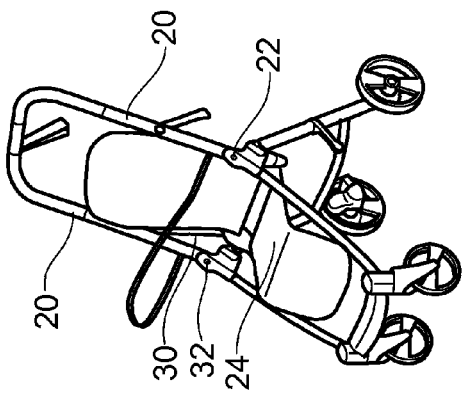
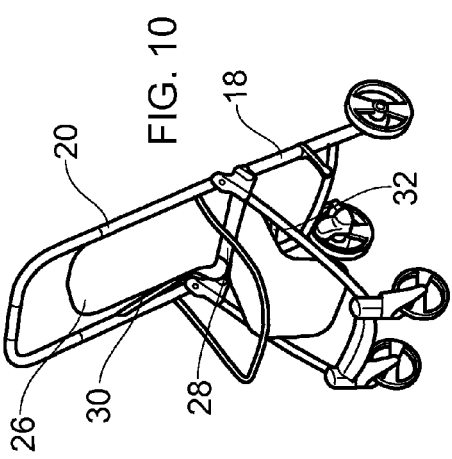
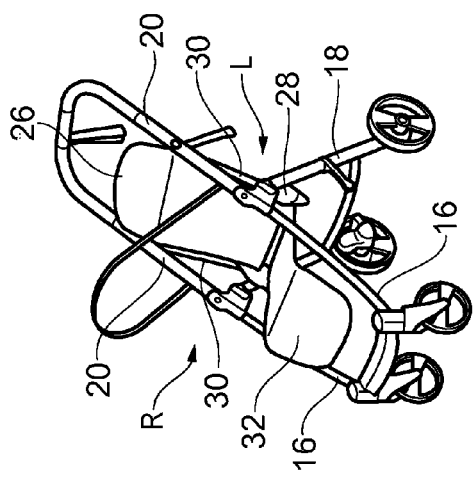

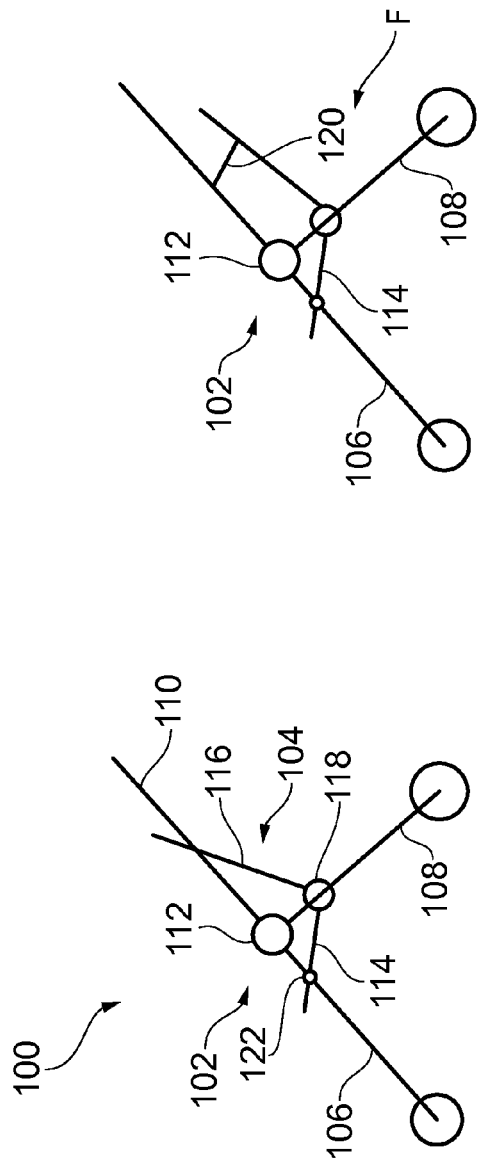
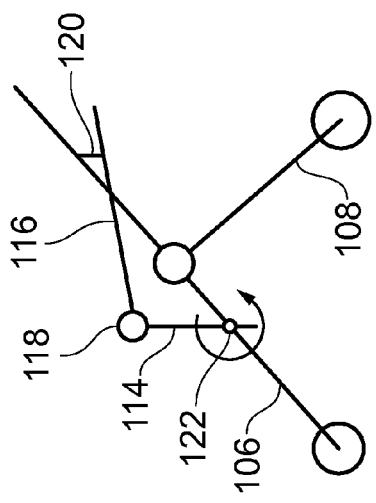
FIG. 13
FIG. 14
FIG. 15

CHILD SUPPORT APPARATUS

CROSS-REFERENCE TO RELATED APPLICATION(S)

The present application claims priority from GB Patent Application No. GB1211741.2, filed on Jul. 3, 2012, entitled "Child Support Apparatus," herein incorporated by reference.

BACKGROUND OF THE INVENTION

1. Field of the Invention

The present invention relates to a collapsible child support apparatus comprising a frame supporting a seat for the child, the frame and the seat having an open condition for seating a child in the seat and a collapsed condition for storage or transportation.

2. State of the Art

An earlier and unpublished pushchair design of the present applicant is shown in highly schematic form in FIG. 13. The pushchair is one example of a collapsible child support apparatus, other examples including prams and buggies (commonly referred to baby carriages or carriages in the United States), and strollers all being for transporting a child and a high chair for supporting a child in a generally static location. The earlier pushchair 100 in FIG. 13 comprises a frame 102 supporting a seat 104 for the child. The frame and the seat have an open condition as shown for seating a child in the seat and a collapsed condition for storing the pushchair or for convenient transportation (not shown).

The frame 102 comprises left and right frame assemblies, although only the left frame assembly can be seen in FIG. 13. Each frame assembly comprises a front member 106, a rear member 108 and a handle member 110 pivotally mounted together by a hinge member 112 to allow pivotal movement of the frame members between open and collapsed conditions.

The seat 104 comprises a seat base 114 supported by the front frame members, a seat back 116 supported by the handle members and a seat pivot 118 to allow the seat back and seat base to pivot between open and closed conditions. As shown more particularly in FIG. 14, the seat back is suspended by flexible material 120, such as a strap or webbing, to the handle members which can be extended to allow the seat back to pivot to any one of a plurality of reclined positions relative to the seat base in the open condition. The seat back is reclined further in FIG. 14 than in FIG. 13 by lengthening the amount of flexible material between the seat back and the handle members. The seat base 114 is connected to the front frame by a pivot 122 to allow the seat base to pivot relative to the frame. The seat pivots when the pushchair is collapsed.

The suspended arrangement of the seat together with the frame shown in FIGS. 13 and 14 allows a lightweight apparatus with a compact fold in the collapsed condition. However, it has been found during experimentation that the seat is susceptible to inversion or part inversion because the seat is suspended. The seat is forced from its normal condition shown in FIGS. 13 and 14 towards an inverted condition shown in FIG. 15 in one of two ways. A child seated in a pushchair may arch their back applying pressure to the seat base forward of the seat base pivot 122. This pressure causes a moment to be applied about the pivot as shown by the arrow in FIG. 15 and the seat base and seat back to pivot about the seat pivot 118. The force inverts or partially inverts the seat allowing the child to slide from the seat. Inversion may also occur when a force F shown in FIG. 14 is imparted to the seat 104 in a forwards direction. The force may be generated for example by another child pushing the seat from behind.

SUMMARY OF THE INVENTION

According to the present invention, there is provided a collapsible child support apparatus comprising a frame supporting a seat for the child, the frame and the seat having an open condition for seating a child in the seat and a collapsed condition, the frame comprising left and right frame assemblies, each frame assembly comprising a front member, a rear member and a handle member pivotally mounted together by a hinge member to allow pivotal movement of the frame members between open and collapsed conditions, the seat comprising a seat base supported by the front frame members, a seat back suspended to the handle members and a seat pivot to allow the seat back and seat base to pivot between open and closed conditions, the seat back being suspended to the handle members to allow the seat back to pivot to any one of a plurality of reclined positions relative to the seat base in the open condition, wherein each frame assembly comprises a strut of fixed length which is connected between the seat pivot and the handle member for resisting movement of the seat pivot relative to the frame in the open condition.

Other preferred and/or optional features of the invention are defined in the accompanying claims.

BRIEF DESCRIPTION OF THE DRAWINGS

In order that the present invention may be well understood, an embodiment thereof, which is given by way of example only, will now be described with reference to the accompanying drawings, in which:

FIGS. 7 to 12 show collapsing of the collapsible child support apparatus viewed in perspective and correspond respectively to FIGS. 1 to 6; and FIGS. 13, 14 and 15 show a child support apparatus without the struts of the apparatus of FIGS. 1 to 12.

DETAILED DESCRIPTION OF THE PREFERRED EMBODIMENTS

Figure 1:
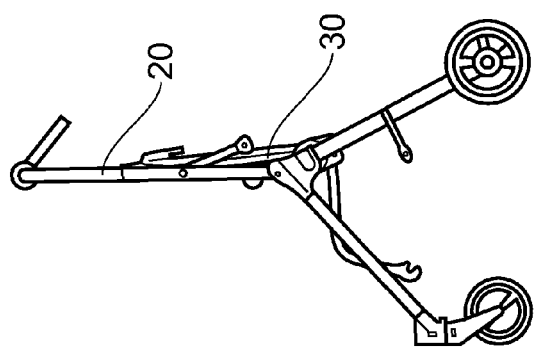
FIGS. 1 to 6 show collapsing of a collapsible child support apparatus viewed in a lateral dimension of the apparatus.
Figure 4:
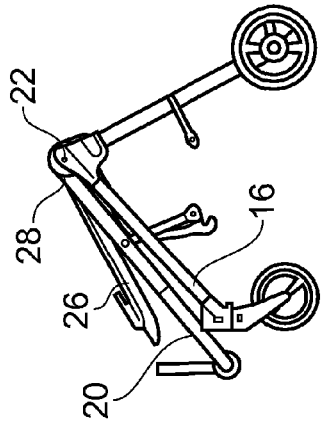
Figure 2:
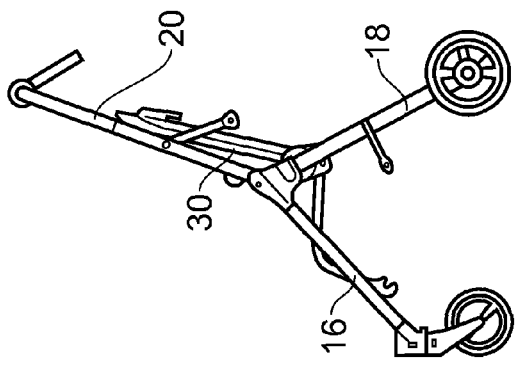
Figure 5:
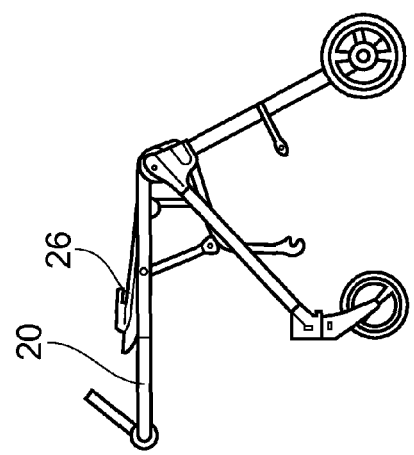
Figure 3:
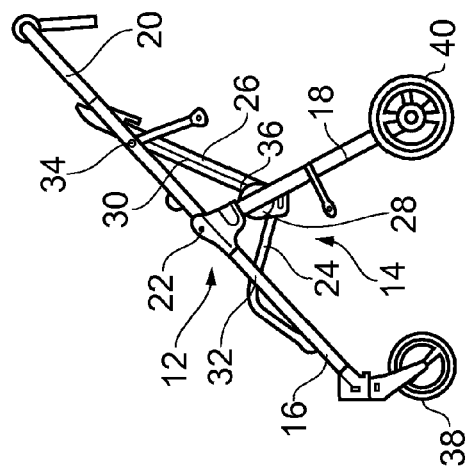

Referring to FIGS. 1 to 12, a collapsible child support apparatus 10 comprises a frame 12 supporting a seat 14 for a child and is similar to the apparatus described in relation to FIGS. 13 and 14. In this example, the apparatus is a pushchair. The frame and the seat have an open condition for seating a child in the seat as shown in FIGS. 1 and 7. FIGS. 2 to 6 and 8 to 12 show the apparatus collapsing to the partially collapsed condition in FIGS. 6 and 12.

The frame 12 comprises left and right frame assemblies L, R (see FIG. 7). Only the left side frame assembly is shown in FIGS. 1 to 6. The frame assemblies are generally symmetric relative to a central longitudinal and vertical plane of the apparatus. Transverse frame members extend between the left and right frame member connecting them together. Each frame assembly L, R comprises a front member 16, a rear member 18 and a handle member 20 pivotally mounted together by a hinge member 22 to allow pivotal movement of the frame members between open and collapsed conditions.

The seat 14 comprises a seat base 24 supported by the front frame members, a seat back 26 supported by the handle members and a seat pivot 28 to allow the seat back and seat base to pivot between open and closed conditions. The seat base and back in the present arrangement are made from a rigid moulding which is covered by a cushioning material. The seat pivot 28 comprises a hinged connection between the seat back and seat base and may comprise a transverse member about which the seat back and seat base are pivotally mounted.

The seat base 24 is connected to the front frame members 16 by a pivot connection 32 to allow the seat base to pivot relative to the frame. Pivoting movement of the seat base occurs principally when the pushchair is collapsed and also to some extent when the seat back is reclined and the rake of the seat base is increased. The seat base pivot can take any suitable form and may comprise a rod extending between the front frame members about which the seat base is pivotally mounted. The seat base extends forwardly of the pivot connection 32 to provide support for the legs of a child when seated in the pushchair.

In the arrangement shown, the seat base 24 and seat back 26 fold about the pivot 28 so that in the collapsed condition they are closely adjacent and generally parallel. The seat back 26 is supported by the handle members 20 to allow the seat back to pivot to any one of a plurality of reclined positions relative to the seat base in the open condition as described in more detail in relation to FIGS. 13 and 14. That is, the seat back is suspended by the handle members by flexible material and the length of the flexible material between connection points on the handle members and the seat back is selectively variable to allow the seat back to pivot to any one of a plurality of reclined positions relative to the seat base in the open condition. The flexible material may be fixed to the connection point on the handle members and to a clamping mechanism on the seat back so that the material can be fed through the mechanism and clamped when the seat is at the required angle to the seat base. A large angle would be appropriate if the seated child wishes to sleep whereas a smaller angle would be appropriate if the child is awake. This way of connecting the seat back to the handle is light and easily adjustable. However, it allows the seat back to move relatively freely particularly when the seat back is in a more reclined position and in certain conditions as described in relation to FIGS. 14 and 15 allows seat inversion.

As indicated above the seat back and seat base comprise rigid members such as plastics mouldings or other strengthening means. Typically in known pushchair designs, a rigid seat is fixed relative to rather than suspended from the frame. That is, a rigid seat often comprises a seat pivot or hub and the seat hub is fixedly mounted on the pushchair. The seat hub comprises a reclining mechanism, such as a releasable ratchet mechanism, which can lock the seat back at different angles relative to the seat base. These types of seat assemblies are relatively bulky and do not produce a compact fold. Suspended seat arrangements invariably comprise a flexible fabric material which is suspended from the frame, similar to a hammock. The seat is not rigid in any way and does not comprise a pivot. As indicated above with reference to FIGS. 14 and 15, seat inversion most frequently occurs due to a child arching their back and causing rotation of the rigid seat base about the seat base pivot, which in turn causes the seat base and seat back to pivot about the seat pivot. Seat inversion is possible because the seat back and seat pivot are suspended. Accordingly, this type of problem occurs only with a rigid seat arrangement that is suspended from the frame.

In the present embodiment, the suspended seat arrangement is retained but additionally each frame assembly comprises a strut 30 of fixed length, or having a length which can be fixed, which is connected between the seat pivot and the handle member for resisting movement of the seat pivot relative to the frame and particularly towards the frame hinge members in upwards and forwards direction, in the open condition. In this regard, the struts 30 fix the spacing between the seat pivot and handle member and resist longitudinal compression and bending forces caused by those forces which would otherwise tend to invert the seat. However, the struts may themselves be relatively lightweight and small and therefore not significantly increase weight or the size of the collapsed pushchair. The struts are preferably made of a lightweight plastics material or a thin metal rod.

The seat base 24 is pivotally mounted to fixed mounting locations 32 of the front members and the length of the seat base between the mounting locations and the seat pivot 28 is fixed by the rigid seat base for constraining movement of the seat pivot relative to the frame in the open condition. The struts 30 are also of fixed length and constrain movement of the seat pivot relative to the frame. In this way, when the pushchair is in the open condition shown in FIGS. 1 and 7, the fixed mounting locations 32, the seat pivot 28 and the mounting locations 34 of the strut to the handle members 20 form a rigid triangle for resisting seat inversion. During movement between collapsed and open conditions of the pushchair, the hinge members 22 are unlocked so that the handle members can be rotated relative to the front members, as shown in FIGS. 2 to 6 and 8 to 12. When the hinge members are unlocked, the rigid triangle is allowed to collapse so that the seat pivot 28 can move towards the hinge members to achieve a compact fold. That is, the line of the rigid triangle extending between locations 32 and 34 is no longer rigid and can fold about the hinge members 22.

The struts 30 are pivotally connected to the seat pivots and the handle members at mounting locations 36, 34 to allow movement of the seat pivot between the open and collapsed conditions. Movement of the seat pivot is controlled when collapsing and opening the pushchair by the fixed length of the seat base and the struts. The pivotal connections at locations 34, 36 of the struts 30 to the seat pivots 28 and the handle members 20 allow pivotal movement of the seat pivot in a longitudinal dimension of the frame (i.e. parallel to the central longitudinal and vertical plane of the pushchair when the pushchair is in its normal open condition resting on the ground). However, the pivotal connections resist movement in a lateral dimension of the frame so that in an open condition the struts prevent the seat pivot from moving laterally. In this way, the child is not susceptible to knocking against the frame during movement, particular over uneven terrain. In one arrangement, the pivotal connections comprise hinged mechanisms for allowing pivoting movement in one plane but restraining movement transverse to that plane.

Figure 6:
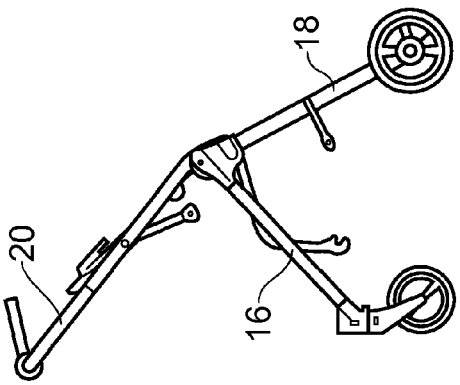

The hinge members 22 are arranged to allow pivotal movement of the handle members 20 relative to the front members 16 from a generally aligned condition when the handle members and the front members are on opposite sides of the hinge members in the open condition shown in FIGS. 1 and 7 to a generally parallel condition when the handle members and the front members are on the same side of the hinge members in the collapsed condition shown in FIGS. 6 and 12. In this arrangement, the handle members are rotated over the hinge members towards the front members from the open condition to the collapsed condition. FIGS. 6 and 12 show the pushchair in a partially collapsed condition. In a fully collapsed condition, the rear members 18 are pivoted towards the front members so that all three frame members of each frame assembly L, R are generally parallel and thereby occupy a minimal amount of space.

Additionally, the struts 30 are arranged to be generally parallel with the handle members and the front members in the collapsed condition so that benefit of providing struts does not cause, to any significant extent, the pushchair to be less compact in the collapsed condition. The term generally parallel in this context means less than an angle of about 10 degrees. Further, the struts are inside the profile of the collapsed pushchair as defined by the handle members and rear members on each side of the front members and do not protrude outwardly from the profile. The profile is the most outer extent of the frame members when the frame members are folded and viewed laterally from one of the sides.

The provision of struts 30 also guides movement of seat components during collapsing so that the seat base, seat back and seat pivot are positioned when folded so that pushchair occupies minimal space. Preferably, all seat components are inside of the previously mentioned frame profile in the collapsed condition. The length of the struts and the mounting locations 34 of the struts to the handle members are selected together with the length of the seat base so that the seat pivot 28 is located on the said same side of the hinge members as the front members and the handle members in the collapsed condition. That is, the seat pivot will be folded to a position which is on the side of the hinge members closest to the wheels 38, 40 as seen in FIG. 6. The hinge members 22 have housings and typically the housings and the frame generally is more resilient to shocks and damage than the seat components. Accordingly, when in the collapsed condition, the housings and other frame members protect the seat components from external shocks because when impacting a surface, for example the ground, the housings and frame members will typically make initial contact rather than the seat.

In an alternative arrangement, the length of the struts and the mounting locations of the struts to the handle members are selected so that the seat pivot is aligned in a lateral dimension with the hinge members in the collapsed condition, As the length of the struts 30 are fixed and the struts are connected to the handle members 20, and the spacing between the mounting location 32 of the seat base and the seat pivot is also fixed, folding movement of the handle members over the hinge members 22 towards the front members guides movement of the seat pivots and the seat base. That is, the seat base is generally parallel with the frame members when folded and the seat base and seat pivot are fixed within the profile of the frame. As the seat base is fixed relative to the frame, the seat back is supported against the seat base in collapsed condition.

The collapsible child support apparatus may be a stroller, pushchair, buggy or pram (baby carriage) having at least three wheels supported by the front and rear members to allow transit of the apparatus on the ground in the open condition. In a three wheel arrangement, there is a single front wheel and two rear wheels. In a four wheel arrangement, respective wheels are supported at the lower ends of the front members and the rear members. The collapsible child support apparatus may also be a high chair.

There have been described and illustrated herein several embodiments of a child support apparatus. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A collapsible child support apparatus comprising:
    a frame supporting a seat for the child, the frame and the seat having an open condition for seating a child in the seat and a collapsed condition;
    wherein the frame comprises left and right frame assemblies, each frame assembly comprising a front member, a rear member and a handle member pivotally mounted together by a hinge member to allow pivotal movement of the frame members between open and collapsed conditions;
    wherein the seat comprises a seat base supported by the front frame members, a seat back suspended to the handle members and a seat pivot to allow the seat back and seat base to pivot between open and closed conditions, the seat back being suspended to the handle members to allow the seat back to pivot to any one of a plurality of reclined positions relative to the seat base in the open condition;
    wherein the seat back is suspended to the handle members by flexible material with the length of the flexible material between connection points on the handle members and the seat back being selectively variable to allow the seat back to pivot to any one of a plurality of reclined positions relative to the seat base in the open condition; and
    wherein each frame assembly comprises a strut of fixed length which is connected between the seat pivot and the handle member for resisting movement of the seat pivot relative to the frame in the open condition and for resisting seat inversion.

2. A collapsible child support apparatus as claimed in claim 1, wherein:
    the seat base is pivotally mounted to fixed mounting locations of the front members and the length of the seat base between the mounting locations and the seat pivot is fixed so that the seat base, struts, handle members and front members form a rigid triangle for resisting movement of the seat pivot relative to the frame in the open condition.

3. A collapsible child support apparatus as claimed in claim 1, wherein:
    the struts are pivotally connected to the seat pivots and the handle members to allow movement of the seat pivot relative to the frame between the open and collapsed conditions.

4. A collapsible child support apparatus comprising:
    a frame supporting a seat for the child, the frame and the seat having an open condition for seating a child in the seat and a collapsed condition;
    wherein the frame comprises left and right frame assemblies, each frame assembly comprising a front member, a rear member and a handle member pivotally mounted together by a hinge member to allow pivotal movement of the frame members between open and collapsed conditions;
    wherein the seat comprises a seat base supported by the front frame members, a seat back suspended to the handle members and a seat pivot to allow the seat back and seat base to pivot between open and closed conditions, the seat back being suspended to the handle members to allow the seat back to pivot to any one of a plurality of reclined positions relative to the seat base in the open condition;
    wherein each frame assembly comprises a strut of fixed length which is connected between the seat pivot and the handle member for resisting movement of the seat pivot relative to the frame in the open condition; and
    wherein the struts include pivotal connections to the seat pivots and to the handle members to allow pivotal movement of the seat pivot in a longitudinal dimension of the frame and resist movement in a lateral dimension of the frame.

5. A collapsible child support apparatus comprising:
a frame supporting a seat for the child, the frame and the seat having an open condition for seating a child in the seat and a collapsed condition;
wherein the frame comprises left and right frame assemblies, each frame assembly comprising a front member, a rear member and a handle member pivotally mounted together by a hinge member to allow pivotal movement of the frame members between open and collapsed conditions;
wherein the seat comprises a seat base supported by the front frame members, a seat back suspended to the handle members and a seat pivot to allow the seat back and seat base to pivot between open and closed conditions, the seat back being suspended to the handle members to allow the seat back to pivot to any one of a plurality of reclined positions relative to the seat base in the open condition;
wherein each frame assembly comprises a strut of fixed length which is connected between the seat pivot and the handle member for resisting movement of the seat pivot relative to the frame in the open condition; and
wherein the hinge members of the left and right frame assemblies are arranged to allow pivotal movement of the handle members relative to the front members from a generally aligned condition when the handle members and the front members are on opposite sides of the hinge members in the open condition to a generally parallel condition when the handle members and the front members are on the same side of the hinge members in the collapsed condition.

6. A collapsible child support apparatus as claimed in claim 5, wherein:
the struts are arranged to be generally parallel with the handle members and the front members in the collapsed condition.

7. A collapsible child support apparatus as claimed in claim 5, wherein:
the length of the struts and the mounting locations of the struts to the handle members are selected so that the seat pivot is located on the said same side of the hinge members as the front members and the handle members in collapsed condition.

8. A collapsible child support apparatus as claimed in claim 5, wherein:
the length of the struts and the mounting locations of the struts to the handle members are selected so that the seat pivot is aligned in a lateral dimension with the hinge members in the collapsed condition.

9. A collapsible child support apparatus as claimed in claim 1, wherein:
the hinge members are arranged to allow the handle members to be rotated over the hinge members towards the front members from the open condition to the collapsed condition.

10. A collapsible child support apparatus as claimed in claim 1, which is part of a stroller, pushchair, buggy or pram having at least three wheels supported by the front and rear members to allow transit of the apparatus on the ground in the open condition.

11. A collapsible child support apparatus as claimed in claim 1, which is part of a high chair.

* * * * *